Dec. 31, 1935.  E. CARETTA  2,026,459
TRANSMISSION GEAR FOR DISTANT CONTROL OR MOTION
Filed Nov. 29, 1932  2 Sheets-Sheet 1
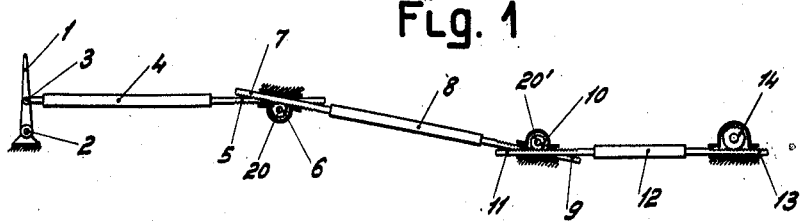
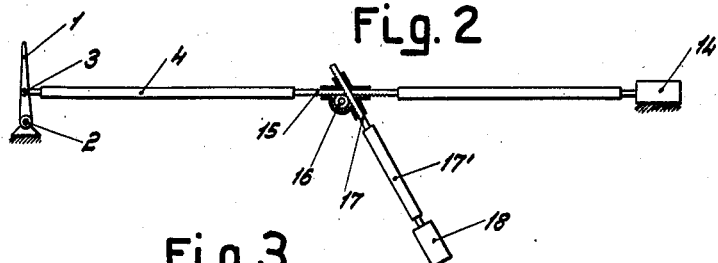
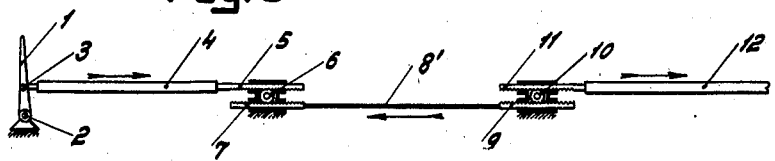
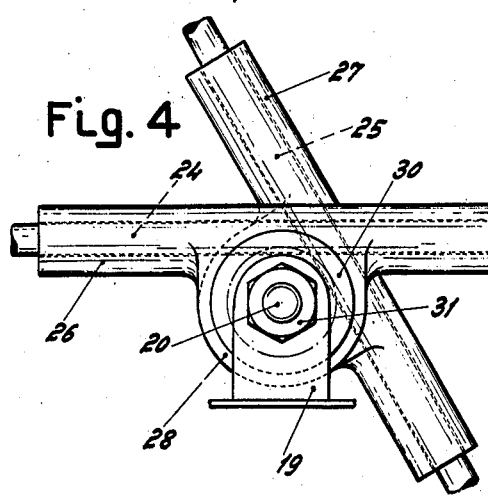
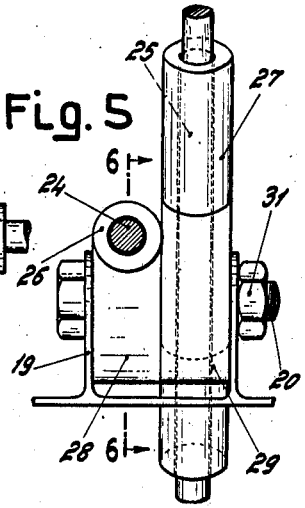
Inventor:-
Ettore Caretta Dec. 31, 1935.  E. CARETTA  2,026,459
TRANSMISSION GEAR FOR DISTANT CONTROL OR MOTION
Filed Nov. 29, 1932  2 Sheets-Sheet 2

Inventor:-
Ettore Caretta
by
Atty.

Patented Dec. 31, 1935

2,026,459

UNITED STATES PATENT OFFICE 2,026,459

TRANSMISSION GEAR FOR DISTANT CONTROL OR MOTION

Ettore Caretta, Turin, Italy

Application November 29, 1932, Serial No. 644,883
In Italy December 11, 1931

11 Claims. (Cl. 74—110)

This invention relates to transmission gears for producing distant control or motion in which the driving member and the driven member are interconnected by parts having an invariable length.

It is known that owing to their length or to directional changes such transmission gears often necessitate the use of intermediate gears which usually consist of levers, pulleys or the like.

The present invention has for its object a transmission gear of this kind which provides for complying with very different conditions of use and ensures in any case a correct transmission with a minimum of loss by friction and lost motion, this transmission gear consisting of members or bars, which may be of rigid or linked or flexible character, having toothed portions and interconnected by means of rotatable toothed means as pinions which are in mesh with said toothed portions of said members.

This invention also comprises the provision of joints each including a support for one or more rotatable toothed means or pinions and guiding means for the toothed portions of the transmission members or bars coacting with said rotatable toothed means.

The accompanying drawings show by way of example various embodiments of transmission gears according to the invention, and:

Figure 1 is a diagram of a transmission gear with two directional changes;

Figure 2 is a diagram of a rectilinear transmission gear with an intermediate off-set drive;

Figure 3 is a diagram showing the construction of a transmission gear with reversal of the direction of motion;

Figure 4 is a side view of a separate joint of the transmission gear on an enlarged scale;

Figure 5 is an end view of the same;

Figure 6:
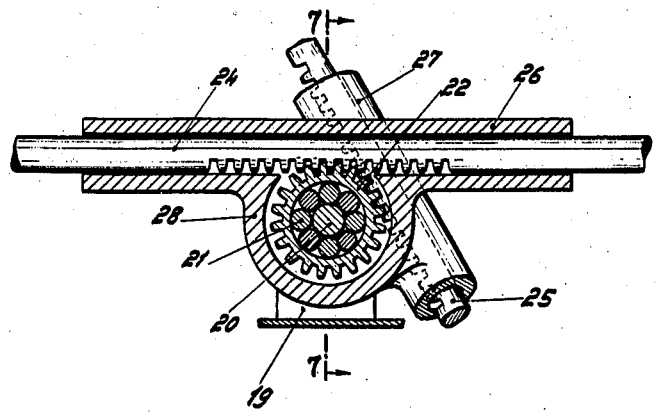
Figure 6 is a section taken on line 6—6 of Figure 5.

This invention has for its object a transmission gear comprising a number of pull or push transmission members which have toothed portions, and joints each including toothed rotatable parts or pinions solid with each other and meshing with the toothed portions of two subsequent members or of a plurality of said members, the actuation imparted to one of said members by a driving member being thus transmitted by its toothed portion to cooperating toothed rotatable parts or pinions and then to toothed portion or portions of other transmission member or members.

Said several transmission members may be in succession to each other and aligned or lying in different directions, or a number of them may branch in different directions from any of said toothed rotatable parts or pinions, or the actuation may be derived from any of said transmission members at any point of its extent by providing toothed means or pinions at such a point.

Further this invention comprises the provision of joints or transmission units intermediate said transmission members; each of said joints or units comprises a support carrying a stud spindle or pivot for pivotally supporting therein said rotatable toothed parts or pinions, as well as sections adjustably carried and supported by said spindle or pivot and support and each comprising a collar section adapted to provide a portion of a casing to encircle said spindle or pivot and toothed parts or pinions rotatable thereon, and a guide section opening in said collar section and providing a guide for reciprocatory movement of the toothed portion of a transmission member in engagement with its cooperating toothed rotatable part or pinion of the joint unit.

In Figure 1 a driving member is shown in the form of a lever 1 fulcrumed on a stationary point 2 and having a member or bar 4 of the transmission gear pivoted thereon at 3. The interconnection of lever 1, or of any other equivalent driving member, with said member or bar 4 may of course be secured by any other manner than by pivotal means, for instance, it may be obtained by means of a toothed quadrant solid with lever 1 and meshing with a toothed portion of member 4. Said member 4 is rigid if the motion is to be transmitted by a thrust or both by thrust and pull, while it is flexible should the motion have to be transmitted by pull only. In any case, the member 4 which may consist of the assembly of several parts (tubes, wires, or the like) has at its end a toothed portion 5 meshing with a pinion 6 rotatable on a stationary pivot 20 and in mesh with a toothed portion 7 of a further member 8 made in the same manner as stated in respect of member 4. Member 8 may be located at any angle with respect to member 4 and its end has a final toothed portion 9 which meshes with a pinion 10 loose on a pivot 20' and in mesh with a toothed portion 11 of a further member 12 which acts for example by means of another toothed portion 13 on a member to 5 be driven this member being diagrammatically as a pinion 14 solid with a shaft of a device (not shown) to be actuated by the manipulation of lever 1.

The number of bars as 4, 8, 12, or of joints as 6, 7, 20; 10, 11, 20', may be materially larger to impart the desired length and path to the transmission.

By variously arranging the axes of pinions 6, 10 and so on, the transmission gear may follow any desired course in space to connect the driving member 1 with the driven element 14.

Figure 2 shows a construction in which from the motion imparted to a member 14 by a member 4 and cooperating means 1, 2, 3, a branch control in another direction must be obtained. For such a purpose the member 4 is provided at an intermediate point with a toothed portion 15 meshing with a pinion 16 which is in mesh with a toothed portion 17 of a member 17' providing a further branch of the transmission which leads to a second member 18 to be controlled in unison with member 14.

There may be a larger number of branches than one and each branch may have any desired extent.

Figure 3 shows a construction in which the direction of motion is reversed by two subsequent joints and more particularly the toothed portions 5 and 7 and 9, 11 of the members 4, 8' and 8', 12 are on opposed sides with respect to axis of rotation of respective intermediate pinions 6 and 10.

In this manner the action imparted in the direction of the arrow to member 4 causes the member 8' to move in the opposite direction this member producing in turn a motion of member 12 in the same direction as that of member 4. Such arrangement provides by way of example for making the member 8' in the form of a flexible tie, as is useful in some cases.

The described arrangements may also be combined with each other to secure requisite conditions.

Every joint comprises a unit of the kind shown in Figures 4–7. It includes a support adapted to be mounted on a stationary point and consisting of a fork or stirrup 19 having a stationary pivot 20 on which one pinion or a number of pinions 22 and 23 solid with each other is or are loosely mounted by means of antifriction rollers 21 for example, said pinion or pinions being in mesh with rack bars 24 and 25 providing the toothed portions of appropriate members as 4, 8, 8' and 12 hereinbefore described. Said toothed portions 24 and 25 are mounted to move axially in rectilinear guides 26 and 27 having ring-shaped sections 28 and 29 to embrace pinions 22 and 23 and being arranged adjacent each other to provide a box having its ends closed by plates 30 which are loose on pivot 20 and act to support said box sections 28 and 29.

The box consisting of two ring-shaped sections 28, 29 and of end plates 30 is located with soft friction intermediate the arms of stirrup 19 and the whole unit is assembled by means of pivot stud 20 on which the pinion 22, 23 is mounted, such stud consisting of a bolt having a nut 31 screwed on its screwthreaded end.

Owing to inherent resiliency of arms of stirrup 19, when the nut 31 is tightened on stud bolt 20, said arms are clamped on plates 30 which in turn clamp sections 28, 29 on each other, such sections being thus locked in their respective angular position they have been located in.

By releasing nut 31 the action clamping sections 28 and 29 on each other and intermediate the arms of stirrup 19 is removed and therefore it is possible to alter the angular respective positions of guides 26, 28 and 27, 29. Thereafter the parts may be clamped anew in the fresh selected position by tightening nut 31 again.

Figure 7:
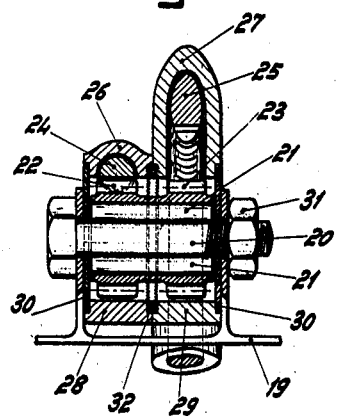
Figure 7 is a transverse section taken on line 7—7 of Figure 6.
Figure 8:
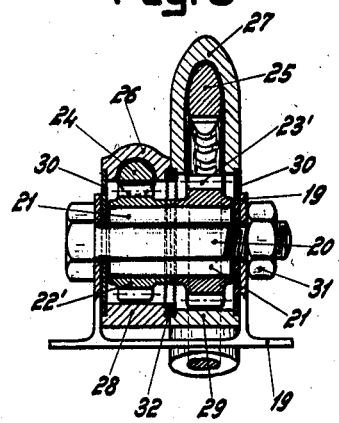
Figure 8 shows a sectional view of a modified construction similar to that of Figure 7.

Said guides may be provided with cooperating indentations on adjacent edges to make them solid with each other, or an intermediate indented member as 32 may be located between them for this purpose as shown in Figures 7 and 8.

When the two members of the transmission gear which intersect at a joint are at an angle with each other, there are provided two pinions or two toothed portions of a single pinion arranged at a side of each other and cooperating with toothed portions of said members which are mounted in adjacent guides as in the illustrated construction of joint; on the contrary, when said members are parallel with each other as in the construction of Figure 3, their two toothed portions may lie in the same plane and be mounted in guides pertaining to the same section of box, they being in mesh with a single pinion.

Instead of two toothed members as above stated, each joint may include a plurality thereof, it being sufficient for such a purpose to assemble on a support as 19 a plurality of box sections each as 26, 28, 30, interconnected by a pivot 20, while a similar member of transmission branches as 25 may be derived therefrom.

Collar sections 28 and 29 of the unit or the end collars of a multiple unit could be in the shape of half boxes adapted to close on to end faces, but the illustrated construction in which all collars are alike and open on both sides is preferred because in this manner each box section may be upturned or reversed with respect to the adjacent one or ones to provide different conditions of operation of the transmission gear.

Figure 8 shows a joint adapted for transmission of motion or control under a varying ratio.

In this construction the joint includes pinions 22', 23' having different diameters, the ratio between several sections of a path of the transmission or between several paths of the transmission being thus able of being altered at will.

What I claim as my invention and desire to secure by United States Letters Patent is:—

1. A device for producing distant motion or control comprising reciprocating transmission members having portions adjacent to each other, racks on said adjacent portions of said members, parts each having a chamber having open side ends and a rectilinear guide member having an opening into said chamber, means for supporting said parts side by side with their chambers in communication with each other, bored plates disposed at the side ends of the assembly of said parts to close said chambers, a pivot extending throughout said plates and chambers, each of said racks being mounted for reciprocating motion in one of said guide members, a toothed member rotatably mounted on said pivot between said plates in said intercommunicating chambers and meshing with said racks in their respective guide members for transmission of motion to and from each other and means on said pivot for locking together said plates and parts.

2. A device for producing distant motion or control comprising reciprocating transmission members having portions adjacent to each other, racks on said adjacent portions of said members, parts each having a collar and a rectilinear guide member having an opening into said collar, said parts being located side by side with their said collars aligned with each other, bored disks on the side ends of the assembly of said collars, a pivot extending through said disks and collars to connect together said parts with freedom for respective angular adjustment, each of said racks being mounted for reciprocating motion in one of said guide members, a bored toothed member loose on said pivot within said collars and meshing with said racks in their respective guide members for transmission of motion to and from each other and means on said pivot for locking together said collars and parts.

3. A device for producing distant motion or control comprising reciprocating transmission members having portions adjacent to each other, racks on said adjacent portions of said members, parts each having a collar and a rectilinear guide member having an opening into said collar, said parts being located side by side with their said collars aligned with each other, interengaging means intermediate said collars, bored disks on the side ends of the assembly of said collars, a pivot extending through said disks and collars to connect together said parts with freedom for respective angular adjustment, each of said racks being mounted for reciprocating motion in one of said guide members, a bored toothed member loose on said pivot within said collars and meshing with said racks in their respective guide members for transmission of motion to and from each other and means on said pivot for forcing together said collars and intermediate interengaging means and locking them angularly.

4. In a transmission device for producing distant motion or control, a support, a pivot in said support, a toothed member loose on said pivot, independent parts loosely mounted side by side on said pivot, each of said parts having a rectilinear guide member tangential with said toothed member and a casing section communicating with the respective guide seat and encircling said toothed member, rack bars each mounted for reciprocation in one of said guide members and meshing with said respective toothed member for transmission of motion to and from each other and means on said pivot for angularly locking together said parts.

5. In a transmission device for producing distant motion or control, a support, a pivot in said support, pinions integral with each other and loose on said pivot, independent parts loosely mounted side by side on said pivot, each of said parts having a casing section encircling one of said pinions, and a rectilinear guide member communicating with the inside of the respective casing section and tangential to said pinion therein, rack bars each mounted for reciprocation in one of said guide members and meshing with said pinion within said respective casing section for transmission of motion to and from each other and means on said pivot for angularly locking together said parts.

6. A device for producing distant motion or control comprising reciprocating transmission members having portions adjacent to each other, racks on said adjacent portions of said members, parts each having a casing section and a rectilinear guide member having an opening into said casing section and determining the line of action of the reciprocating transmission members for any adjusted position of the casing sections, means for assembling said parts side by side with freedom for respective angular adjustment, each of said racks being mounted for reciprocating motion in one of said guide members, a toothed member rotatable within said casing sections and meshing with said racks in the respective guide members of said parts for transmission of motion to and from each other and means for locking together said casing sections.

7. A device for producing distant motion or control comprising reciprocating transmission members having portions adjacent to each other, racks on said adjacent portions of said members, parts each having a casing section and a rectilinear guide member having an opening into said casing section and determining the line of action of the reciprocating transmission members for any adjusted position of the casing sections, said parts being located side by side with their said casing sections aligned with each other, a pivot extending through said casing sections to connect together said parts with freedom for respective angular adjustment, each of said racks being mounted for reciprocating motion in one of said guide members, a bored toothed member loose on said pivot within said casing sections and meshing with said racks in their respective guide members for transmission of motion to and from each other and means on said pivot for locking together said casing sections and parts.

8. A device for producing distant motion or control comprising reciprocating transmission members having portions adjacent to each other, racks on said adjacent portions of said members, parts each having a casing section and a rectilinear guide member having an opening into said casing section and determining the line of action of the reciprocating transmission members for any adjusted position of the casing sections, said parts being located side by side with their said casing sections aligned with each other, interengaging means intermediate said casing sections, means connecting together said parts with freedom for respective angular adjustment, each of said racks being mounted for reciprocating motion in one of said guide members, a toothed member rotatable within said casing sections and meshing with said racks in their respective guide members for transmission of motion to and from each other and means for forcing together said casing sections and intermediate interengaging means and locking them angularly.

9. A device for producing distant motion or control comprising reciprocating transmission members having portions adjacent to each other, racks on said adjacent portions of said members, parts each having a casing section and a rectilinear guide member having an opening into said casing section and determining the line of action of the reciprocating transmission members for any adjusted position of the casing sections, means for supporting said parts side by side with freedom for respective angular adjustment, a pivot extending throughout said casing sections, each of said racks being mounted for reciprocating motion in one of said guide members, a toothed member rotatably mounted on said pivot within said casing sections and meshing with said racks in their respective guide members for transmission of motion to and from each other and means for locking together said parts in any relative angular position.

10. In a transmission device for producing distant motion or control, a support, a toothed member rotatable on said support, independent parts loosely mounted side by side on said support, each of said parts having a rectilinear guide member tangential with said toothed member and a casing section communicating with the respective guide member and encircling said toothed member, rack bars each mounted for reciprocation in one of said guide members and meshing with said respective toothed member for transmission of motion to and from each other, means for angularly locking together said parts and said guide members determining the line of action of said rack bars for any adjusted position of said casing sections.

11. In a transmission device for producing distant motion or control, a support, a pivot in said support, a toothed member loose on said pivot, independent parts loosely mounted side by side on said pivot, each of said parts having a rectilinear guide member tangential with said toothed member and a casing section communicating with the respective guide seat and encircling said toothed member, rack bars each mounted for reciprocation in one of said guide members and meshing with said respective toothed member for transmission of motion to and from each other, means for angularly locking together said parts and said guide members determining the line of action of said rack bars for any adjusted position of said casing sections.

ETTORE CARETTA.